United States Patent
Lin et al.

(10) Patent No.: US 12,410,495 B2
(45) Date of Patent: Sep. 9, 2025

(54) MAGNESIUM-LITHIUM-ALUMINUM-ZINC ALLOY SUITABLE FOR BEING PROCESSED THROUGH AIR MELT AND STRUCTURAL ARTICLE

(71) Applicant: AMLI MATERIALS TECHNOLOGY CO., LTD., Taoyuan (TW)

(72) Inventors: Chun-Kai Lin, Hsinchu County (TW); Jian-Yi Guo, Taoyuan (TW); Chin-Ting Fan, Taoyuan (TW)

(73) Assignee: AMLI MATERIALS TECHNOLOGY CO., LTD., Taoyuan (TW)

( * ) Notice: Subject to any disclaimer, the term of this patent is extended or adjusted under 35 U.S.C. 154(b) by 0 days.

(21) Appl. No.: 18/093,042

(22) Filed: Jan. 4, 2023

(65) Prior Publication Data
US 2023/0243024 A1 Aug. 3, 2023

(30) Foreign Application Priority Data
Jan. 28, 2022 (TW) .................................. 111104005

(51) Int. Cl.
C22C 23/00 (2006.01)
C22C 1/02 (2006.01)
C22F 1/06 (2006.01)

(52) U.S. Cl.
CPC ............... C22C 23/00 (2013.01); C22C 1/02 (2013.01); C22F 1/06 (2013.01)

(58) Field of Classification Search
CPC ............ C22C 23/00; C22C 1/02; C22F 1/06
See application file for complete search history.

(56) References Cited

U.S. PATENT DOCUMENTS 5,059,390 A * 10/1991 Burleigh ................. C22C 23/00
420/408

FOREIGN PATENT DOCUMENTS

CN      112593131         4/2021
CN      112593131   A  *  4/2021    ............... C22C 1/02
WO      WO-2018021361 A1 *  2/2018    ............. C22C 23/00

OTHER PUBLICATIONS

CN 112593131A, Liu et al., machine translation. (Year: 2021).*
WO-2018021361-A1, Goto, machine translation. (Year: 2018).*
Search Report for foreign counterpart application TW111104005, date Jul. 1, 2022.
(English translation) Search Report for foreign counterpart application TW111104005, date Jul. 1, 2022.

* cited by examiner

*Primary Examiner* — John A Hevey
(74) *Attorney, Agent, or Firm* — Demian K. Jackson; Jackson IPG PLLC

(57) ABSTRACT

A Mg—Li—Al—Zn alloy is disclosed. The Mg—Li—Al—Zn alloy comprises, in weight percent: 5-15% Li, 1.5-9.0% Al, 0.5-1.5% Zn, 0.4-1.3% Y, 0.18-1.01% Nd, 0.09-0.65% Ce, and the balance Mg and incidental impurities. Experimental data have proved that, this novel Mg—Li—Al—Zn alloy has a flashover temperature in a range between 620° C. and 700° C., such that the flashover temperature of the specifically-designed Mg—Li—Al—Zn alloy is greater than that of commercial LAZ521, LAZ721, LAZ771, LAZ921, and LAZ1491 alloys. Therefore, the Mg—Li—Al—Zn alloy of the present invention can be processed to be a structural article through air melt and casting process.

6 Claims, 3 Drawing Sheets

MAGNESIUM-LITHIUM-ALUMINUM-ZINC ALLOY SUITABLE FOR BEING PROCESSED THROUGH AIR MELT AND STRUCTURAL ARTICLE

BACKGROUND OF THE INVENTION

1. Field of the Invention

The present invention relates to the technology field of magnesium-lithium-aluminum alloys, and more particularly to a specifically-designed magnesium-lithium-aluminum alloy that is suitable for being processed to be a structural article through air melt.

2. Description of the Prior Art

It is known that lightweight alloys are classified into aluminum alloys, titanium alloys and magnesium-lithium alloys, of which the magnesium-lithium alloys are further divided into magnesium-lithium-zinc alloys (abbreviated to LZ alloys), magnesium-lithium-aluminum alloys (abbreviated to LA alloys), and magnesium-lithium-aluminum-zinc alloys (abbreviated to LAZ alloys). Moreover, a few related researches have reported that the LAZ alloys are superior to the LZ alloys and the LA alloys in thermal radiation ability.

In recent years, computer manufacturers are constantly devote to make laptop computers be more and more thin and having lightweight. As a result, the LAZ alloy having outstanding thermal radiation ability and low specific gravity has been testified as the most appropriate material for making the housing case of a laptop computer. Engineers skilled in development and manufacture of LAZ alloys certainly know that, a LAZ alloy commonly contains 9-12% Li, and has a specific gravity in a range between 1.45 and 1.60. In addition, the LAZ alloy also includes advantages of high specific strength, good shock resistance, easy to be cut, and capable of shielding electromagnetic interference (EMI), so that the LAZ alloy is widely applied in the manufacture of various structural articles that are for use in the manufacture of bicycle, car and airplane.

In general, method for making a metal-made structural article comprises the steps of: (1) disposing a metal material in a crucible, and then melting the metal material by using air melt; and (2) after scooping-up the slag from the crucible, filling the melted metal material into a casting mold, thereby processing the melted metal material to be a structural article. However, it is a pity that the LAZ alloy cannot be processed to be a structural article by using above-mentioned method due to having a flashover temperature lower than the melting temperature thereof. As described in more detail below, when the LAZ alloy in the crucible is heated to be melted by an electric furnace, flashover would take place in the LAZ alloy in case of the heating temperature exceeding the flashover temperature of the LAZ alloy. However, in such case the LAZ alloy is not melted because the heating temperature is not greater than the melting temperature of the LAZ alloy. Accordingly, there is only vacuum melting method suitable for achieving the melting process of the LAZ alloy.

In conclusion, the conventional LAZ alloy cannot be melted by using air melt due to having a flashover temperature lower than the melting temperature thereof, so that there is still room for improvement in the conventional LAZ. In view of that, inventors of the present application have made great efforts to make inventive research and eventually provided a magnesium-lithium-aluminum-zinc alloy suitable for being processed through air melt.

SUMMARY OF THE INVENTION

The primary objective of the present invention is to disclose a Mg—Li—Al—Zn alloy, comprising, in weight percent: 5-15% Li, 1.5-9.0% Al, 0.5-1.5% Zn, 0.4-1.3% Y, 0.18-1.01% Nd, 0.09-0.65% Ce, and the balance Mg and incidental impurities. Experimental data have proved that, this novel Mg—Li—Al—Zn alloy has a flashover temperature in a range between 620° C. and 700° C., such that the flashover temperature of the specifically-designed Mg—Li—Al—Zn alloy is greater than that of currently commercial LAZ521, LAZ721, LAZ771, LAZ921, and LAZ1491 alloys. Therefore, the Mg—Li—Al—Zn alloy of the present invention can be processed to be a structural article through air melt and casting process.

For achieving the primary objective mentioned above, the present invention provides an embodiment of the Mg—Li—Al—Zn alloy, comprising, in weight percent:
  5-15% Li;
  1.5-9.0% Al;
  0.5-1.5% Zn;
  0.4-1.3% Y;
  0.18-1.01% Nd;
  0.09-0.65% Ce; and
  the balance Mg and incidental impurities;
  wherein the magnesium-lithium-aluminum-zinc alloy has a melting temperature and a flashover temperature greater than the melting temperature, such that the Mg—Li—Al—Zn alloy is suitable for being processed to be a structural article through air melt.

In one embodiment, the flashover temperature is in a range between 620° C. and 700° C.

In one embodiment, after being cold rolled to have a thickness reduction of 54%, the Mg—Li—Al—Zn alloy has a yield strength in a range between 201 MPa and 240 MPa.

In one embodiment, after being cold rolled to have a thickness reduction of 54%, the Mg—Li—Al—Zn alloy has a percentage elongation in a range between 20% and 25%.

In one embodiment, the Mg—Li—Al—Zn alloy is produced by using a manufacturing method selected from a group consisting of: vacuum arc melting process, electric resistance wire heating process, induction heating process, rapid solidification process, mechanical alloying method in combination with spark plasma sintering process, and powder metallurgic method.

In one practicable embodiment, the Mg—Li—Al—Zn alloy is an alloy bulk made by sequentially applying a melting process and a solidification process to a virgin material.

In another one practicable embodiment, the Mg—Li—Al—Zn alloy is processed to be in an as-cast state, or being in a heat-treated state after being applied with a heat treatment that is selected from a group consisting of precipitation hardening treatment, annealing treatment and homogenization treatment.

Moreover, the present invention also discloses an article, which is made by sequentially applying an air melt process and a casting process to the Mg—Li—Al—Zn alloy of the present invention.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

Figure 1:
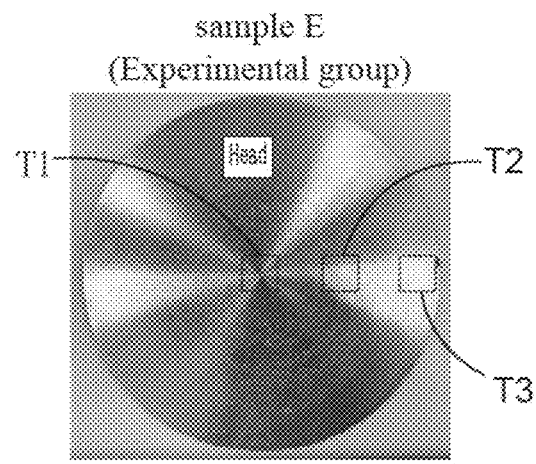
FIG. 1 shows a real image of a sample E in an experimental group.

To more clearly describe a magnesium-lithium-aluminum-zinc alloy suitable for being processed through air melt according to the present invention, embodiments of the present invention will be described in detail with reference to the attached drawings hereinafter.

The present invention discloses a magnesium-lithium-aluminum-zinc alloy (abbreviated to Mg—Li—Al—Zn alloy), comprising, in weight percent: 5-15% Li, 1.5-9.0% Al, 0.5-1.5% Zn, 0.4-1.3% Y, 0.18-1.01% Nd, 0.09-0.65% Ce, and the balance Mg and incidental impurities. Particularly, this Mg—Li—Al—Zn alloy has a melting temperature and a flashover temperature that is greater than the melting temperature. Therefore, a metal-made structural article can be produced by sequentially applying an air melt process and a casting process to the Mg—Li—Al—Zn alloy.

When conducting the manufacture of the Mg—Li—Al—Zn alloy, the Mg—Li—Al—Zn alloy can be processed to be an alloy bulk made by sequentially applying a melting process and a solidification process to a virgin material. In addition, it is allowable to produce the Mg—Li—Al—Zn alloy by using any one possible manufacturing method, for example, vacuum arc melting method, electric resistance wire heating method, induction heating process, electric induction heating method, rapidly solidification method, mechanical alloying method, and powder metallurgic method. Moreover, during the manufacture of the Mg—Li—Al—Zn alloy, it is also allowable to process the Mg—Li—Al—Zn alloy to be in an as-cast state, or to make the Mg—Li—Al—Zn alloy be in a heat-treated state by utilizing a heat treatment, such as precipitation hardening treatment, annealing treatment, and homogenization treatment.

In general, method for making a metal-made structural article comprises the steps of: (1) disposing a metal material in a crucible, and then melting the metal material by using air melt; and (2) after scooping-up the slag from the crucible, filling the melted metal material into a casting mold, thereby processing the melted metal material to be a structural article. However, it is a pity that the commercial LAZ521, LAZ721, LAZ771, LAZ921, and LAZ1491 alloys all cannot be processed to be a structural article by using above-mentioned method due to having a flashover temperature lower than the melting temperature thereof. It is worth noting that, the Mg—Li—Al—Zn alloy of the present invention has a flashover temperature in a range between 620° C. and 700° C., such that the flashover temperature of the Mg—Li—Al—Zn alloy of the present invention is greater than that of commercial LAZ521, LAZ721, LAZ771, LAZ921, and LAZ1491 alloys. As a result, the Mg—Li—Al—Zn alloy of the present invention can be processed to be a structural article like bicycle wheel rim and computer housing case by using above-mentioned method.

Inventors of the present invention have completed experiments in order to prove that the Mg—Li—Al—Zn alloy can indeed be made.

First Experiment

In the first experiment, two samples of alloys are fabricated by vacuum arc melting process. The following table (1) lists each sample's elemental composition.

TABLE 1

|  | LAZ521 | LAZ521 + 0.78Y + 0.65 Nd + 0.41Ce |
|---|---|---|
| Sample in control group | A | — |
| Sample in experimental group | — | A |

According to table (1), it is known that sample A in control group is a commercial LAZ521 alloy. Engineers skilled in development and manufacture of LAZ alloys certainly know that, the LAZ521 alloy contains, in weight percent: 5% Li, 2% Al, 1% Zn, and the balance Mg and incidental impurities (e.g., Mn). On the other hand, the sample A in experimental group is made by utilizing a vacuum arc melting furnace to process a commercial LAZ521 alloy, 0.78 wt % yttrium with form of powder or piece, 0.65 wt % neodymium with form of powder or piece, and 0.41 wt % cerium with form of powder or piece to be a Mg—Li—Al—Zn alloy.

Second Experiment

In the second experiment, two samples of alloys are fabricated by vacuum arc melting process. The following table (2) lists each sample's elemental composition.

TABLE 2

|  | LAZ721 | LAZ721 + 0.34Y + 0.41 Nd + 0.28Ce |
|---|---|---|
| Sample in control group | B | — |
| Sample in experimental group | — | B |

According to table (2), it is known that sample B in control group is a commercial LAZ721 alloy. Engineers skilled in development and manufacture of LAZ alloys certainly know that, the LAZ721 alloy contains, in weight percent: 7% Li, 2% Al, 1% Zn, and the balance Mg and incidental impurities (e.g., Mn). On the other hand, the sample B in experimental group is made by utilizing a vacuum arc melting furnace to process a commercial LAZ721 alloy, 0.34 wt % yttrium with form of powder or piece, 0.41 wt % neodymium with form of powder or piece, and 0.28 wt % cerium with form of powder or piece to be a Mg—Li—Al—Zn alloy.

Third Experiment

In the third experiment, two samples of alloys are fabricated by vacuum arc melting process. The following table (3) lists each sample's elemental composition.

TABLE 3

|  | LAZ771 | LAZ771 + 0.92Y + 0.46 Nd + 0.28Ce |
|---|---|---|
| Sample in control group | C | — |
| Sample in experimental group | — | C |

According to table (3), it is known that sample C in control group is a commercial LAZ771 alloy. Engineers skilled in development and manufacture of LAZ alloys certainly know that, the LAZ771 alloy contains, in weight percent: 7% Li, 7% Al, 1% Zn, and the balance Mg and incidental impurities (e.g., Mn). On the other hand, the sample C in experimental group is made by utilizing a vacuum arc melting furnace to process a commercial LAZ771 alloy, 0.92 wt % yttrium with form of powder or piece, 0.46 wt % neodymium with form of powder or piece, and 0.28 wt % cerium with form of powder or piece to be a Mg—Li—Al—Zn alloy.

Fourth Experiment

In the fourth experiment, three samples of alloys are fabricated by vacuum arc melting process. The following table (4) lists each sample's elemental composition.

TABLE 4

|  | LAZ921 | LAZ921 + 0.63Y + 0.51 Nd + 0.25Ce | LAZ921 + 0.57Y + 0.14 Nd + 0.08Ce |
|---|---|---|---|
| Sample in control group | D | — | — |
| Sample in experimental group | — | D | E |

According to table (4), it is known that sample D in control group is a commercial LAZ921 alloy. Engineers skilled in development and manufacture of LAZ alloys certainly know that, the LAZ921 alloy contains, in weight percent: 9% Li, 2% Al, 1% Zn, and the balance Mg and incidental impurities (e.g., Mn). On the other hand, the sample D in experimental group is made by utilizing a vacuum arc melting furnace to process a commercial LAZ921 alloy, 0.63 wt % yttrium with form of powder or piece, 0.51 wt % neodymium with form of powder or piece, and 0.25 wt % cerium with form of powder or piece to be a Mg—Li—Al—Zn alloy. Moreover, the sample E in experimental group is made by utilizing the vacuum arc melting furnace to process a commercial LAZ921 alloy, 0.57 wt % yttrium with form of powder or piece, 0.14 wt % neodymium with form of powder or piece, and 0.08 wt % cerium with form of powder or piece to be a Mg—Li—Al—Zn alloy.

Fifth Experiment

In the fifth experiment, two samples of alloys are fabricated by vacuum arc melting process. The following table (5) lists each sample's elemental composition.

TABLE 5

|  | LAZ1491 | LAZ1491 + 1.2Y + 0.8 Nd + 0.6Ce |
|---|---|---|
| Sample in control group | E | — |
| Sample in experimental group | — | F |

According to table (5), it is known that sample E in control group is a commercial LAZ1491 alloy. Engineers skilled in development and manufacture of LAZ alloys certainly know that, the LAZ1491 alloy contains, in weight percent: 14% Li, 9% Al, 1% Zn, and the balance Mg and incidental impurities (e.g., Mn). On the other hand, the sample F in experimental group is made by utilizing a vacuum arc melting furnace to process a commercial LAZ1491 alloy, 1.2 wt % yttrium with form of powder or piece, 0.8 wt % neodymium with form of powder or piece, and 0.6 wt % cerium with form of powder or piece to be a Mg—Li—Al—Zn alloy.

Testing data of the samples in control group and the samples in experimental group are integrated in following table (6A), table (6B), table (7A), and table (7B).

TABLE 6A

|  | Sample A in control group (LAZ521) | Sample B in control group (LAZ721) | Sample C in control group (LAZ771) |
|---|---|---|---|
| Flashover temperature (° C.) | 580.1<br>574.5<br>585.4 | 550.3<br>569.3<br>570.1 | 513.9<br>522.1<br>531.6 |
| Melting temperature (° C.) | 603.4 | 590.4 | 592.1 |

TABLE 6B

|  | Sample D in control group (LAZ921) | Sample E in control group (LAZ1491) |
|---|---|---|
| Flashover temperature (° C.) | 587.5<br>570.3<br>571.1 | 489.6<br>461.2<br>483.8 |
| Melting temperature (° C.) | 580.4 | 550.5 |

TABLE 7A

|  | Sample A in experimental group | Sample B in experimental group | Sample C in experimental group |
|---|---|---|---|
| Flashover temperature (° C.) | 636.5<br>622.7<br>621.5 | 669.5<br>642.7<br>644.5 | 612.8<br>653.2<br>607.4 |
| Melting temperature (° C.) | 604.4 | 590.4 | 595.6 |

TABLE 7B

|  | Sample D in experimental group | Sample E in experimental group | Sample F in experimental group |
|---|---|---|---|
| Flashover temperature (° C.) | 704.9<br>626.0<br>651.1 | 664.2<br>641.1<br>636.8 | 607.3<br>632.1<br>630.1 |
| Melting temperature (° C.) | 581 | 582.4 | 550.5 |

Figure 2:
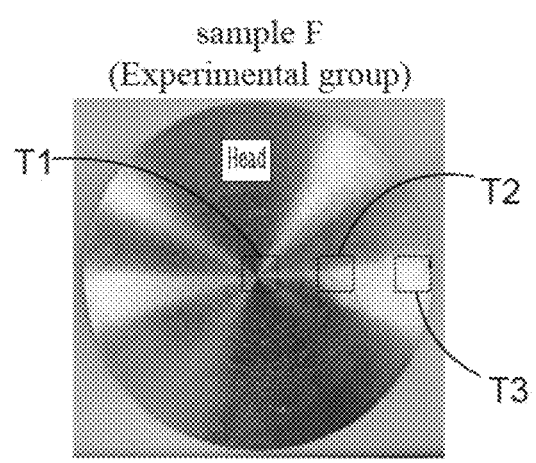
FIG. 2 shows a real image of a sample F in the experimental group.

On the other hand, FIG. 1 shows a real image of the sample E in experimental group, and FIG. 2 shows a real image of the sample F in experimental group. It is worth explaining that, T1, T2 and T3 labeled in the real image of FIG. 1 and the real image of FIG. 2 are sampling positions. When collecting the testing data of the sample E, three test materials are token out from the sampling positions T1, T2 and T3, respectively, and then a flashover temperature measurement, a melting temperature measurement and a composition analysis of the three test materials are completed. Likewise, when collecting the testing data of the sample F, three test materials are token out from the sampling positions T1, T2 and T3, respectively, and then a flashover temperature measurement, a melting temperature measurement and a composition analysis of the three test materials are completed. As a result, the testing data of the sample E in experimental group is summarized in following table (8), and the testing data of the sample F in experimental group is summarized in following table (9).

TABLE 8

| sampling position | Li (w t%) | Al (wt %) | Zn (wt %) | Y (wt %) | Nd (wt %) | Ce (wt %) |
|---|---|---|---|---|---|---|
| T1 | 9.255 | 1.755 | 0.957 | 0.771 | 0.549 | 0.379 |
| T3 | 9.311 | 1.547 | 1.030 | 0.425 | 0.354 | 0.261 |

TABLE 9

| sampling position | Li (wt %) | Al (wt %) | Zn (wt %) | Y (wt %) | Nd (wt %) | Ce (wt %) |
|---|---|---|---|---|---|---|
| T1 | 14.9454 | 7.8382 | 0.6834 | 1.7853 | 1.2268 | 0.8044 |
| T3 | 15.7985 | 7.4111 | 0.6967 | 0.6074 | 0.4779 | 0.3569 |

Sixth Experiment

Inventors of the present invention further completes a sixth experiment. In the sixth experiment, three samples of alloys are fabricated by vacuum arc melting process. The following table (10) lists each sample's elemental composition.

TABLE 10

|  | LAZ921 + 0.35Y + 0.36 Nd + 0.25Ce | LAZ921 + 0.57Y + 0.14 Nd + 0.08Ce | LAZ921 + 0.58Y + 0.49 Nd + 0.32Ce |
|---|---|---|---|
| Sample in experimental group | G | H | I |

Engineers skilled in development and manufacture of LAZ alloys certainly know that, the commercial LAZ921 alloy contains, in weight percent: 9% Li, 2% Al, 1% Zn, and the balance Mg and incidental impurities (e.g., Mn). On the other hand, the sample G in experimental group is made by utilizing a vacuum arc melting furnace to process a commercial LAZ921 alloy, 0.35 wt % yttrium with form of powder or piece, 0.36 wt % neodymium with form of powder or piece, and 0.25 wt % cerium with form of powder or piece to be a Mg—Li—Al—Zn alloy. Moreover, the sample H in experimental group is made by utilizing a vacuum arc melting furnace to process a commercial LAZ921 alloy, 0.57 wt % yttrium with form of powder or piece, 0.14 wt % neodymium with form of powder or piece, and 0.08 wt % cerium with form of powder or piece to be a Mg—Li—Al—Zn alloy. In addition, the sample I in experimental group is made by utilizing a vacuum arc melting furnace to process a commercial LAZ921 alloy, 0.58 wt % yttrium with form of powder or piece, 0.49 wt % neodymium with form of powder or piece, and 0.32 wt % cerium with form of powder or piece to be a Mg—Li—Al—Zn alloy. Testing data of the foregoing three samples are integrated in following table (11).

TABLE 11

|  | Sample G in experimental group | Sample H in experimental group | Sample 1 in experimental group |
|---|---|---|---|
| Flashover temperature (° C.) | 630.5<br>625.5<br>628.5 | 643.0<br>633.0<br>632.3 | 645.8<br>622.0<br>635.9 |
| Melting temperature (° C.) | 581.5 | 584.5 | 582.3 |

Figure 3:
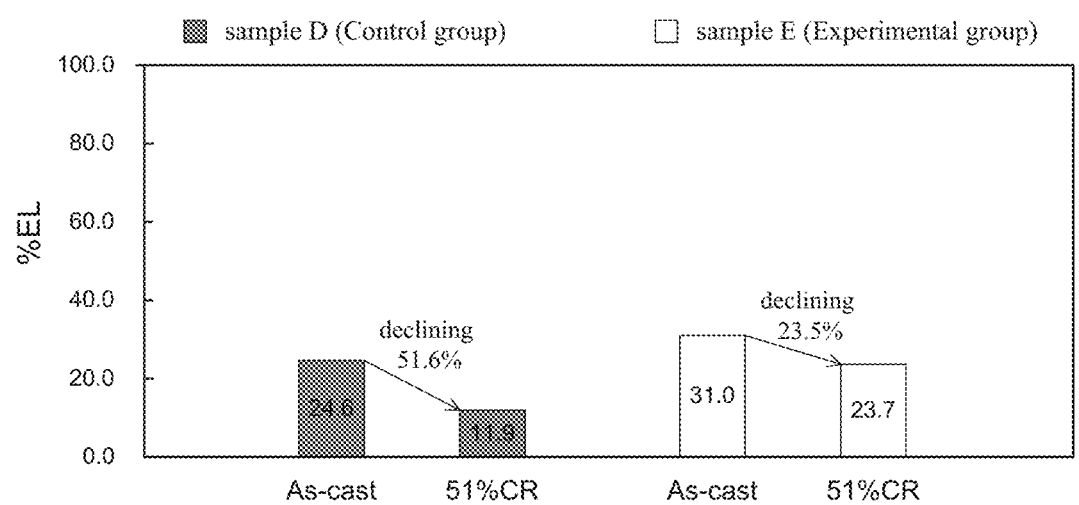
FIG. 3 shows a bar chart for presenting percentage elongation (% EL) of a sample G in the experimental group and a sample D in a control group.

Furthermore, inventors of the present invention also complete a mechanical property measurement of the sample G in the experimental group and the sample D in the control group. FIG. 3 shows a bar chart for presenting percentage elongation (% EL) of the sample G in the experimental group and the sample D in a control group. According to FIG. 3, it is found that the sample D processed to be in an as-cast state exhibits 24.6% EL. However, after being cold rolled to have a thickness reduction of 51%, the sample D has the lower percentage elongation (from 24.6% EL rolling down to 11.9% EL). On the other hand, the sample G (i.e., the Mg—Li—Al—Zn alloy of the present invention) processed to be in an as-cast state exhibits 31.0% EL, and has a slightly lower percentage elongation (from 31.0% EL rolling down to 23.7% EL) after being cold rolled to have a thickness reduction of 51%. Therefore, testing data of FIG. 3 have proved that, the Mg—Li—Al—Zn alloy of the present invention is superior to the commercial LAZ alloy in resistance against cold work hardening.

Figure 4:
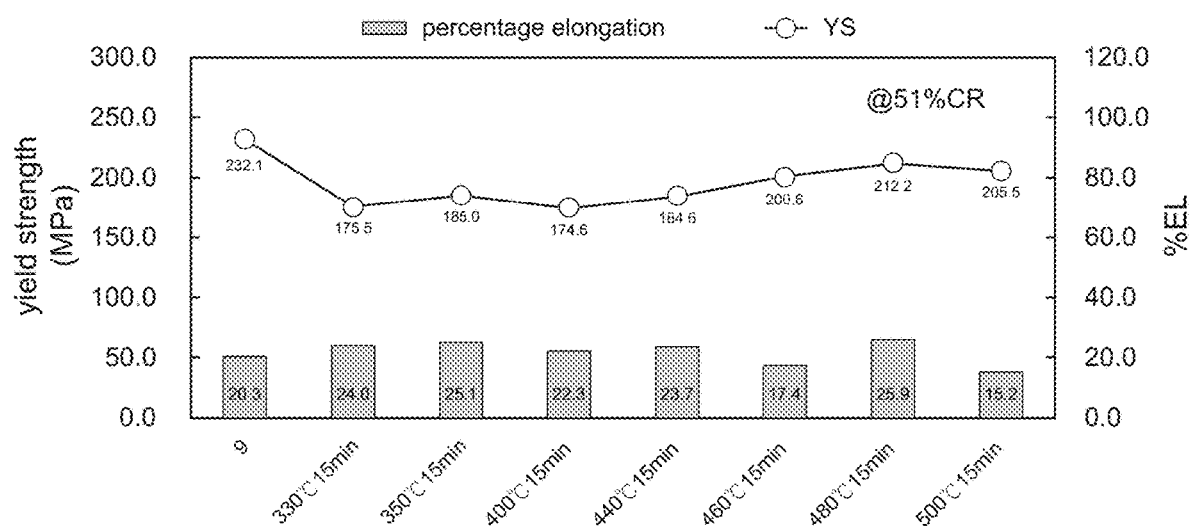
FIG. 4 shows a bar chart for presenting yield strength (YS) and % EL of the sample G in the experimental group.

In addition, inventors of the present invention also complete a yield strength (YS) measurement of the sample G in the experimental group. FIG. 4 shows a bar chart for presenting yield strength (YS) and % EL of the sample G in the experimental group. According to testing data of FIG. 2, it is understood that, after being cold rolled to have a thickness reduction of 54%, the Mg—Li—Al—Zn alloy has a yield strength in a range between 201 MPa and 240 MPa. Therefore, testing data of FIG. 4 have proved that, the Mg—Li—Al—Zn alloy of the present invention is superior to the commercial LAZ alloy in yield strength.

Therefore, above descriptions have introduced the Mg—Li—Al—Zn alloy suitable for being processed through air melt according to the present invention completely and clearly. Moreover, the above description is made on embodiments of the present invention. However, the embodiments are not intended to limit the scope of the present invention, and all equivalent implementations or alterations within the spirit of the present invention still fall within the scope of the present invention.

What is claimed is:

1. A magnesium-lithium-aluminum-zinc alloy, being suitable for application in manufacturing structural article through an air melting process, having a melting temperature and a flashover temperature greater than the melting temperature, and consisting of, in weight percent:
   5-15% Li;
   1.5-9.0% Al;
   0.5-1.5% Zn;
   three rare elements, including 0.4-1.3% Y, 0.18-1.01% Nd and 0.09-0.65% Ce; and
   the balance Mg and incidental impurities;
   wherein a ratio of Ce to Nd is in a range between 0.5 and 0.7;
   wherein after being cold rolled to have a thickness reduction of 54%, the magnesium-lithium-aluminum-zinc alloy has a yield strength in a range between 201 MPa and 240 MPa,
   wherein the flashover temperature is in a range between 620° C. and 700° C.

2. The magnesium-lithium-aluminum-zinc alloy of claim 1, wherein after being cold rolled to have a thickness reduction of 54%, the magnesium-lithium-aluminum-zinc alloy having a percentage elongation in a range between 20% and 25%.

3. The magnesium-lithium-aluminum-zinc alloy of claim 1, being produced by using a manufacturing method selected from a group consisting of: vacuum arc melting process, electric resistance wire heating process, induction heating process, rapid solidification process, mechanical alloying method in combination with spark plasma sintering process, and powder metallurgic method.

4. The magnesium-lithium-aluminum-zinc alloy of claim 1, wherein the magnesium-lithium-aluminum-zinc alloy is an alloy bulk made by sequentially applying a melting process and a solidification process to a virgin material.

5. The magnesium-lithium-aluminum-zinc alloy of claim 1, wherein the magnesium-lithium-aluminum-zinc alloy is processed to be in an as-cast state, or being in a heat-treated state after being applied with a heat treatment that is selected from a group consisting of precipitation hardening treatment, annealing treatment and homogenization treatment.

6. An article, being made of a magnesium-lithium-aluminum-zinc alloy according to claim 1.

* * * * *